(12) United States Patent
Lee et al.

(10) Patent No.: US 9,648,245 B2
(45) Date of Patent: May 9, 2017

(54) LOW-LIGHT IMAGE CAPTURE METHOD AND IMAGE CAPTURE APPARATUS

(71) Applicant: SAMSUNG ELECTRONICS CO., LTD., Suwon-si, Gyeonggi-do (KR)

(72) Inventors: Seung Yun Lee, Hwaseong-si (KR); Su Gon Baek, Seoul (KR); Yi Lee Seo, Gimhae-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/665,416

(22) Filed: Mar. 23, 2015

(65) Prior Publication Data

US 2015/0195440 A1 Jul. 9, 2015

Related U.S. Application Data

(63) Continuation of application No. 13/953,866, filed on Jul. 30, 2013, now Pat. No. 9,025,078.

(30) Foreign Application Priority Data

Jul. 30, 2012 (KR) ........................ 10-2012-0083439

(51) Int. Cl.
*H04N 5/235* (2006.01)
*H04N 5/232* (2006.01)

(52) U.S. Cl.
CPC ......... *H04N 5/2352* (2013.01); *H04N 5/2353* (2013.01); *H04N 5/23245* (2013.01); *H04N 5/23232* (2013.01)

(58) Field of Classification Search
None
See application file for complete search history.

(56) References Cited

U.S. PATENT DOCUMENTS

| 2005/0200744 | A1 | 9/2005 | Kobayashi | |
|---|---|---|---|---|
| 2005/0231606 | A1 | 10/2005 | Suzuki | |
| 2006/0029382 | A1* | 2/2006 | Uchida | G03B 7/00 396/166 |
| 2008/0187235 | A1* | 8/2008 | Wakazono | H04N 5/243 382/255 |
| 2010/0194963 | A1 | 8/2010 | Terashima | |
| 2011/0149095 | A1 | 6/2011 | Kikuchi | |

FOREIGN PATENT DOCUMENTS

| JP | 2009-049575 A | 3/2009 |
|---|---|---|
| JP | 2010-028596 A | 2/2010 |

* cited by examiner

*Primary Examiner* — Justin P Misleh
(74) *Attorney, Agent, or Firm* — Drinker Biddle & Reath LLP

(57) ABSTRACT

An image capture method includes performing light metering with respect to a subject in response to a first control signal, setting an ISO value and a shutter speed value based on result of the light metering, increasing the ISO value by a first amount and decreasing the shutter speed value by a second amount in response to a second control signal to capture a plurality of images, where the second amount is greater than the first amount, performing gamma correction with respect to the plurality of images to increase brightness of each image, and synthesizing the plurality of gamma corrected images to obtain a single image with improved brightness.

14 Claims, 8 Drawing Sheets

LOW-LIGHT IMAGE CAPTURE METHOD AND IMAGE CAPTURE APPARATUS

CROSS-REFERENCE TO RELATED PATENT APPLICATIONS

This application is a continuation of U.S. patent application Ser. No. 13/953,866, filed Jul. 30, 2013, which claims the priority benefit of Korean Patent Application No. 2012-0083439, filed on Jul. 30, 2012, in the Korean Intellectual Property Office, the disclosures of which are incorporated herein in their entirety by reference.

BACKGROUND

1. Field

Embodiments of the invention relate to an image capture apparatus and method for obtaining an image of a subject.

2. Related Art

An image capture apparatus, such as a digital camera or a camcorder, supports scene modes in which an image capture mode is automatically set according to the status of a subject or surroundings thereof and an image is captured according to the set image capture mode. In this case, the image capture apparatus has an image processing algorithm for each scene mode such that when one of the scene modes is set, an image is processed according to an algorithm corresponding to the set scene mode. For example, in a portrait mode, the face of a subject is recognized through a facial recognition function to capture an image of a smiling face. In a sports mode, shutter speed is increased to correctly capture an image of a moving subject.

In capturing an image, the quantity of light around a subject may be an important factor affecting the quality of the image. That is, if the quantity of light is not sufficient, an image has insufficient brightness with the result that it may be difficult to distinguish between a subject and the surroundings thereof. For this reason, it may be necessary to obtain appropriate quantity of light according to contents to be expressed through the image. However, it may be difficult to obtain sufficient quantity of light according to the surroundings of the subject. In this case, desired brightness of the image is not obtained due to insufficient quantity of light.

In a digital type image capture apparatus, an ISO value indicating the sensitivity of a charge-coupled device is increased to compensate for the insufficient quantity of light. However, if the ISO value is excessively increased, the amount of noise in the image is increased together with the increase of brightness, which deteriorates the quality of the resulting image. Even in a case in which a shutter speed value is increased (i.e. shutter speed is lowered) to obtain a much greater quantity of light, shaking of the image capture apparatus due to the slow shutter speed is reflected in the image, such that the resulting image may be blurred.

SUMMARY

Various embodiments provide an image capture apparatus and method to capture an image under low-brightness conditions. When capturing the image under low-brightness conditions, the increase of an ISO value is reduced if possible and a shutter speed value is lowered if possible to capture the image at fast shutter speed, and, in order to compensate for an insufficient ISO value, a plurality of images is obtained through burst mode and gamma correction is performed on the respective images. The gamma corrected images are synthesized, thereby obtaining a single image with improved brightness.

Additional features of the invention will be set forth in part in the description which follows and, in part, will become apparent from the description, or may be learned by practicing the invention.

In accordance with an embodiment, an image capture method includes performing light metering with respect to a subject in response to a first control signal, setting an ISO value and a shutter speed value based on result of the light metering, increasing the ISO value by a first amount and decreasing the shutter speed value by a second amount in response to a second control signal to capture a plurality of images, where the second amount is greater than the first amount, performing gamma correction on the plurality of images to increase brightness of each image, and synthesizing the plurality of gamma corrected images to obtain a single image with improved brightness.

The plurality of images may be obtained through burst mode.

The plurality of images may be raw file format images.

Each image of the plurality of raw file format images may be converted into a YUV file format that separately expresses brightness information and color information, and the plurality of YUV file format images may be synthesized to obtain the single image.

The first control signal may be a light metering control signal, and the second control signal may be an image capture control signal.

An increase in amount of the ISO value may be determined to compensate for underexposure due to the decrease of the shutter speed value, through the increase of the ISO value and the gamma correction.

The ISO value may be increased by n/2 stop when the shutter speed value is decreased by n stop, and gamma correction may compensate for a brightness value corresponding to n/2 stop of the ISO value.

The image capture method may further include deleting the plurality of images after synthesizing the plurality of images to obtain the single image.

In accordance with another embodiment, an image capture method includes setting a mode of an image capture apparatus to a low-brightness capture mode, performing light metering with respect to a subject in response to a first control signal, setting an ISO value and a shutter speed value based on results of the light metering, increasing the ISO value by a first amount and decreasing the shutter speed value by a second amount in response to a second control signal to capture a plurality of images, where the second amount is greater than the first amount, performing gamma correction on the plurality of images to increase brightness of each image, and synthesizing the plurality of gamma corrected images to obtain a single image with improved brightness.

The mode of the image capture apparatus may be automatically set to the low-brightness capture mode under low-brightness conditions.

The mode of the image capture apparatus may be automatically set to the low-brightness capture mode under low-brightness conditions, and execution of the low-brightness capture mode may be indicated through a display unit when the low-brightness capture mode is executed.

The mode of the image capture apparatus may be manually set to the low-brightness capture mode.

In accordance with a further embodiment, an image capture apparatus includes a charge-coupled device, sensitivity of which corresponds to an ISO value, a shutter, speed of which corresponds to a shutter speed value, a digital signal processor that performs gamma correction on obtained images, and a controller that performs light metering with respect to a subject in response to a first control signal, sets the ISO value and the shutter speed value based on results of the light metering, increases the ISO value by a first amount and to decreases the shutter speed value by a second amount in response to a second control signal to capture a plurality of images, where the second amount is greater than the first amount, performs gamma correction on the plurality of images to increase brightness of each image, and synthesizes the plurality of gamma corrected images to obtain a single image with improved brightness.

An increase in amount of the ISO value may be determined to compensate for underexposure due to the decrease of the shutter speed value, through the increase of the ISO value and the gamma correction.

The ISO value may be increased by n/2 stop when the shutter speed value is decreased by n stop, and the gamma correction may compensate for a brightness value corresponding to n/2 stop of the ISO value.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
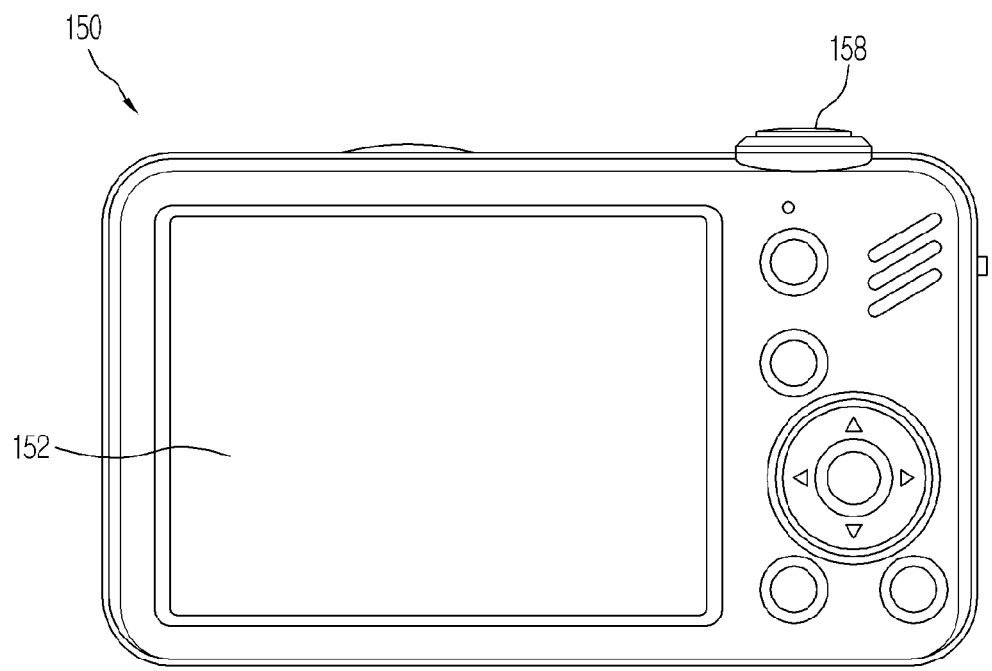
FIG. 1 is a diagram showing an image capture apparatus, according to an embodiment.

Reference will now be made in detail to the embodiments, examples of which are illustrated in the accompanying drawings, wherein like reference numerals refer to like elements throughout.

FIG. 1 is a view showing an image capture apparatus, according to an embodiment. FIG. 1 illustrates a digital camera, which captures images of a subject, converts the images into digital data, and records the digital data in a storage device, as an example of an image capture apparatus 150. However, embodiments of the invention are not limited to the digital camera as shown in FIG. 1 and may be applied to other image capture apparatuses, such as a camcorder and a mobile communication terminal (with a camera). Also, embodiments of the invention may be applied to a case in which a television or a computer is communicatively connected to an image capture apparatus via a wired or wireless communication device. An image may be a still image or a moving image. Image capture is an operation of processing images of a subject as data and storing the data. In the image capture apparatus 150 of FIG. 1, a display unit 152 may display an image of a subject input through a lens before the image is captured, and, after the image is captured, may display the captured image. Also, while the image of the subject or the captured image is displayed, a menu and information related to image capture and a user interface to enable setting of various options may be displayed together with the image. The image capture apparatus 150 also includes a shutter release button 158.

Figure 2:
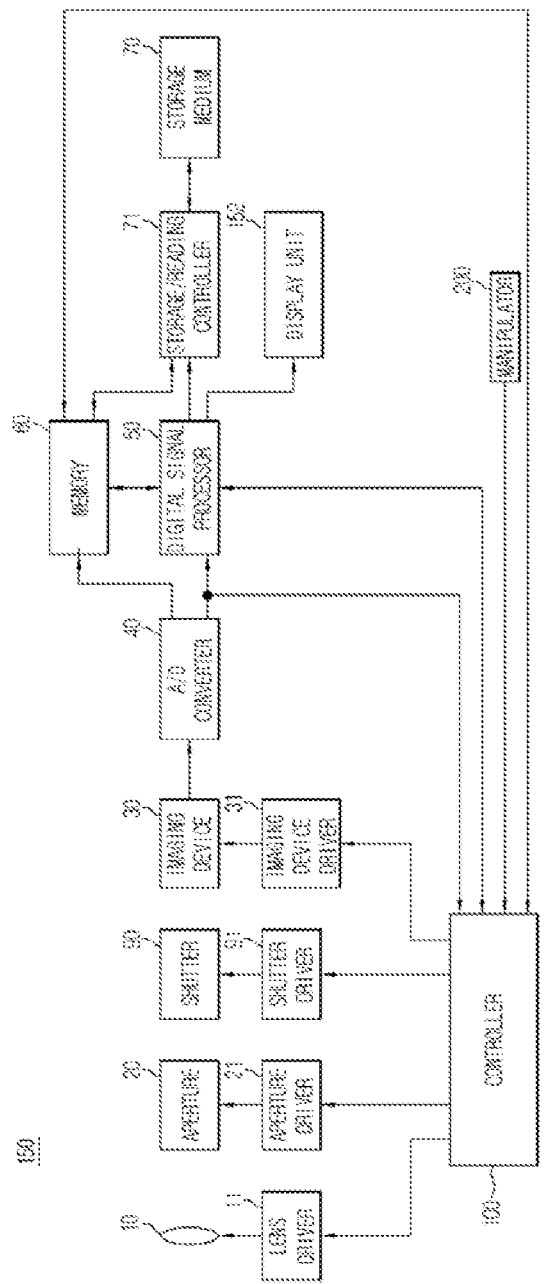
FIG. 2 is a diagram showing a control system of the image capture apparatus shown in FIG. 1.

FIG. 2 is a diagram showing a control system of the image capture apparatus shown in FIG. 1. Overall operation of the image capture apparatus 150 is controlled by a controller 100. In addition, the image capture apparatus 150 includes a manipulator 200 to generate a predetermined electric signal in response to user manipulation and to transmit the electric signal to the controller 100 such that user manipulation is transmitted to the controller 100. The electric signal from the manipulator 200 is transmitted to the controller 100 such that the controller 100 controls the image capture apparatus 150 according to the electrical signal. The manipulator 200 is different from the user interface of the display unit 152. The user interface of the display unit 152 is a software-based graphical user interface, whereas the manipulator 200 is a hardware-based mechanical manipulator. The manipulator 200 may include an arrow key, a command dial, a wheel, and various buttons.

The controller 100 controls a lens driver 11, an aperture driver 21, a shutter driver 91, and a imaging device driver 31. Consequently, the position of a lens 10, an opening degree of an aperture 20, release of a shutter 90, and the sensitivity of an imaging device 30 (e.g., a charge-couple device) are controlled. The imaging device 30 converts an input optical signal into an analog electrical signal. An analog/digital converter 40 converts the analog electrical signal into digital data. Alternatively, the imaging device 30 may perform digital conversion without using the analog/digital converter 40. For an electronic shutter in which the shutter 90 is not provided but a shutter function is realized through electronic control of the imaging device 30, the controller 100 may control the imaging device 30 to perform a shutter function.

The image data, generated by the imaging device 30 and converted by the analog/digital converter 40, may be input to a digital signal processor 50 via a memory 60 or directly input to the digital signal processor 50. The image data may also be input to the controller 100 as needed. The memory 60 may include a read only memory (ROM) or a random access memory (RAM). The digital signal processor 50 may perform digital signal processing, such as gamma correction and white balance change, as needed.

The image data output from the digital signal processor 50 are transmitted to the display unit 152, by which the image data are displayed as an image. In this embodiment, the display unit 152 may be a touchscreen, which is touched to perform a predetermined input operation. The image data output from the digital signal processor 50 are input to a storage/reading controller 71 via the memory 60 or directly input to the storage/reading controller 71. The storage/reading controller 71 stores the image data in a storage medium 70 as an image file according user request or a predetermined automatic storage routine. The storage/reading controller 71 may read data from an image file stored in the storage medium 70 and provides the data to the display unit 152 via the memory 60 or another route such that the display unit 152 displays an image. The storage medium 70 may be detachably mounted in a memory slot or fixedly mounted in the image capture apparatus 150.

Figure 3:
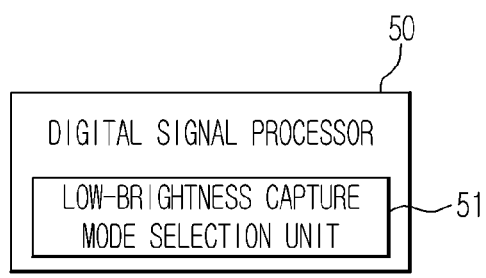
FIG. 3 is a diagram showing an embodiment of a digital signal processor of the image capture apparatus shown in FIG. 2.

FIG. 3 is a diagram showing an embodiment of the digital signal processor of the image capture apparatus shown in FIG. 2. In particular, the digital signal processor 50 shown in FIG. 3 is configured such that in a low-brightness capture mode according to an embodiment, the image capture apparatus 150 determines surroundings thereof (for example, a low-brightness condition) to select entry into the low-brightness capture mode. A user does not participate in selecting the low-brightness capture mode. The low-brightness capture mode according to the embodiment is provided such that in order to obtain an image having sufficient brightness under low-brightness conditions in which the quantity of light is insufficient, the sensitivity (ISO value) of the imaging device 30 is minimized within an allowable range and a shutter speed value (SS) is maximized within an allowable range during capture and synthesis of a plurality of images. Gamma correction is performed with respect to each image to compensate for the reduction in brightness caused by minimizing the sensitivity (ISO value) of the imaging device 30, thereby securing more than a predetermined level of brightness. The low-brightness condition may be determined based on the quantity of light introduced through the lens 10 or the quantity of light around the image capture apparatus 150 measured using an illuminance sensor (not shown). In this case, a reference quantity of light may be preset, and the low-brightness capture mode according to the embodiment may be executed when measured quantity of light is less than the reference quantity of light. Alternatively, brightness information may be acquired through histogram analysis of a preview image, and execution of the low-brightness capture mode may be decided based on the brightness information of the preview image.

To this end, the digital signal processor 50 shown in FIG. 3 includes a low-brightness capture mode selection unit 51. The low-brightness capture mode selection unit 51 enables the image capture apparatus 150 to enter the low-brightness capture mode when the quantity of light around the image capture apparatus 150 is equal to or less than the reference quantity of light.

Figure 4:
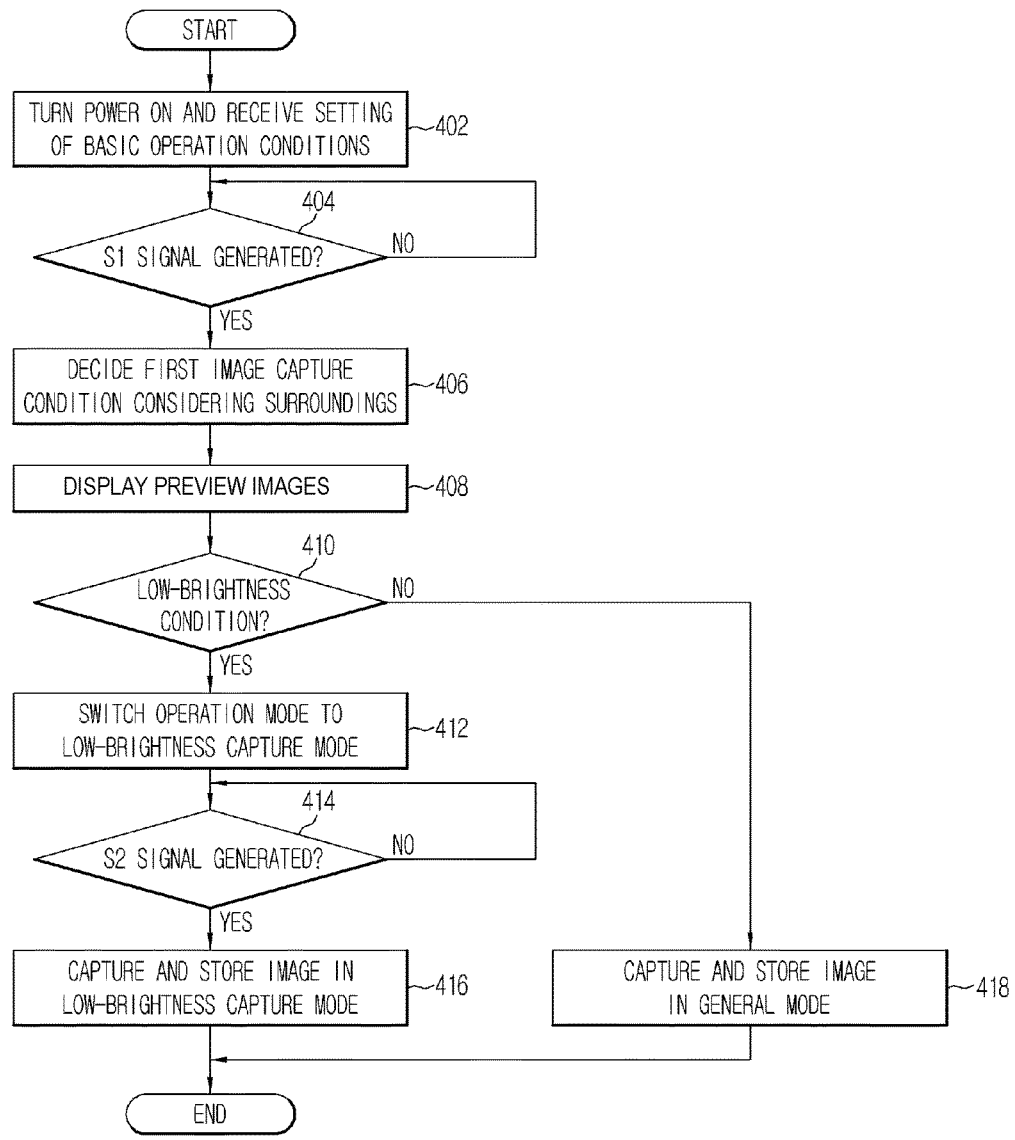
FIG. 4 is a flowchart showing an image capture control method, according to an embodiment.

FIG. 4 is a flowchart showing an image capture control method, according to an embodiment. In the image capture control method shown in FIG. 4, a low-brightness capture mode is selected based on determination of the digital signal processor 50, and the low-brightness capture mode is executed under control of the controller 100.

As shown in FIG. 4, the controller 100 receives setting of basic operation conditions in a state in which the image capture apparatus 150 is on (402). The setting of basic operation conditions includes setting of an operation mode and setting of an image size, quality, and resolution. When an S1 signal (first control signal) is generated in this state (404), the controller 100 performs focusing and light metering with respect to a subject and sets a first image capture condition based on light metering information (406). The S1 signal is a signal generated to perform focusing and light metering with respect to the subject according to first user manipulation of a shutter release button 158. At this time, image capture is not performed. The first image capture condition set in response to the S1 signal includes the sensitivity, i.e. an ISO value, of the imaging device 30 and a shutter speed value SS based on the light metering information. For example, the ISO value may be set to 100 and the shutter speed value may be set to 1 second (s) as principal conditions for determining the brightness of an image based on light metering information around the image capture apparatus 150. The ISO value and the shutter speed value may be changed depending upon the light metering information around the image capture apparatus 150. When the first image capture condition including the ISO value and the shutter speed value is set, a preview image reflecting the first image capture condition is generated and displayed through the display unit 152 (408). Upon determining that the first image capture condition is a low-brightness condition, in which the quantity of light around the image capture apparatus 150 is not sufficient, at the operation of displaying the preview image (YES of 410), the controller 100 switches the operation mode of the image capture apparatus 150 to a low-brightness capture mode to execute the low-brightness capture mode (412). When an image capture signal, i.e. an S2 signal (second control signal), is generated according to further user manipulation of the shutter release button 158 after the operation mode of the image capture apparatus 150 has been switched to the low-brightness capture mode (YES of 414), the controller 100 captures an image in the low-brightness capture mode and stores the captured image in the storage medium 70 (416). The S2 signal is a signal generated to capture an image according to further user manipulation of the shutter release button 158 after the generation of the S1 signal. Image capture and storage in the low-brightness capture mode will hereinafter be described in detail with reference to FIG. 8. Upon determining at operation 410 that the first image capture condition is not the low-brightness condition (NO of 410), the controller 100 captures an image in another image capture mode (for example, an image capture mode based on a basic condition set at operation 402) different from the low-brightness condition and stores the captured image in the storage medium 70 (418). When an image is captured in a general image capture mode, the image is also captured according to generation of the S2 signal.

Figure 5:
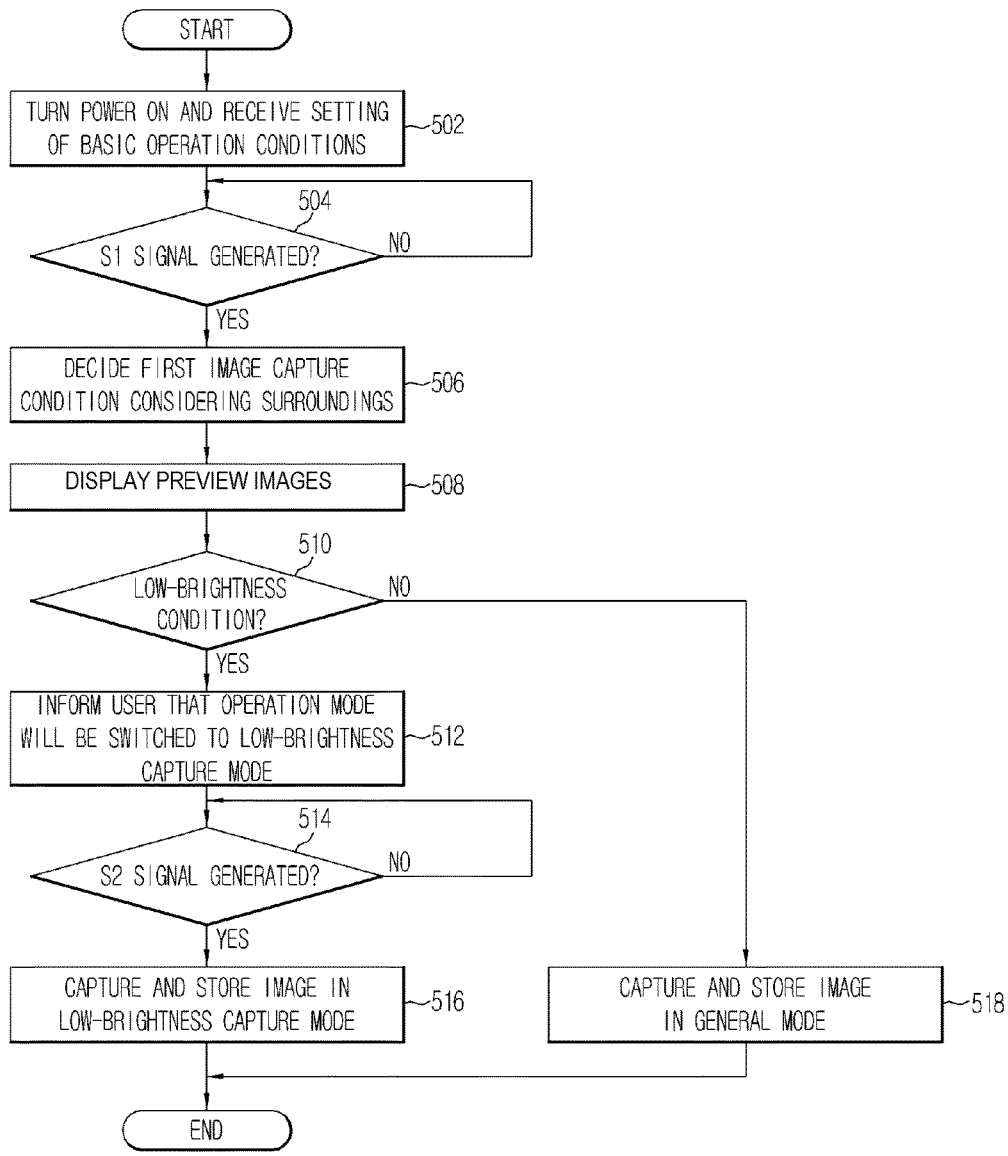
FIG. 5 is a flowchart showing an image capture control method, according to another embodiment.

FIG. 5 is a flowchart showing an image capture control method according to another embodiment. In the image capture control method shown in FIG. 5, a low-brightness capture mode is selected based on determination of the digital signal processor 50, and the low-brightness capture mode is executed under control of the controller 100. When the operation mode of the image capture apparatus 150 is switched to the low-brightness capture mode, however, the controller displays a message informing a user that the operation mode of the image capture apparatus 150 will be switched to the low-brightness capture mode through the display unit 152.

As shown in FIG. 5, the controller 100 receives setting of basic operation conditions in a state in which the image capture apparatus 150 is on (502). The setting of basic operation conditions includes setting of an operation mode and setting of an image size, quality, and resolution. When an S1 signal (first control signal) is generated in this state (504), the controller 100 sets a first image capture condition based on the surroundings of the image capture apparatus 150 (506). The S1 signal is a signal generated to perform focusing and light metering with respect to a subject according to first user manipulation of the shutter release button 158. At this time, image capture is not performed. The first image capture condition set when the S1 signal is generated includes the sensitivity, i.e. an ISO value, of the imaging device 30 and a shutter speed value SS. For example, the ISO value may be set to 100 and the shutter speed value may be set to 1 second (s) as principal conditions for determining the brightness of an image based on the quantity of light around the image capture apparatus 150. The ISO value and the shutter speed value may be changed depending upon the quantity of light around the image capture apparatus 150. When the first image capture condition including the ISO value and the shutter speed value is set, a preview image reflecting the first image capture condition is generated and displayed through the display unit 152 (508). Upon determining that the first image capture condition is a low-brightness condition, in which the quantity of light around the image capture apparatus 150 is not sufficient, at the operation of displaying the preview image (YES of 510), the controller 100 displays a message informing a user that the operation mode of the image capture apparatus 150 will be switched to the low-brightness capture mode through the display unit 152 and switches the operation mode of the image capture apparatus 150 to the low-brightness capture mode to execute the low-brightness capture mode (512). The user may recognize that the operation mode of the image capture apparatus 150 will be switched to the low-brightness capture mode from the message displayed on the display unit 152. If the user wishes to execute the low-brightness capture mode, the user may generate an S2 signal to capture an image. On the other hand, if the user does not wish to execute low-brightness capture mode, the user may release the S1 state (i.e. focused state) of the shutter release button 158 such that an image is not captured in the low-brightness capture mode. The S2 signal is a signal generated to capture an image according to further user manipulation of the shutter release button 158 after the generation of the S1 signal. When an image capture signal, i.e. an S2 signal (second control signal), is generated according to further user manipulation of the shutter release button 158 after the operation mode of the image capture apparatus 150 has been switched to the low-brightness capture mode (YES of 514), the controller 100 captures an image in the low-brightness capture mode and stores the captured image in the storage medium 70 (516). Image capture and storage in the low-brightness capture mode will hereinafter be described in detail with reference to FIG. 8. Upon determining at operation 510 that the first image capture condition is not the low-brightness condition (NO of 510), the controller 100 captures an image at another image capture mode (for example, an image capture mode based on a basic condition set at operation 502) different from the low-brightness condition and stores the captured image in the storage medium 70 (518). When an image is captured in a general image capture mode, the image is also captured according to generation of the S2 signal.

Figure 6:
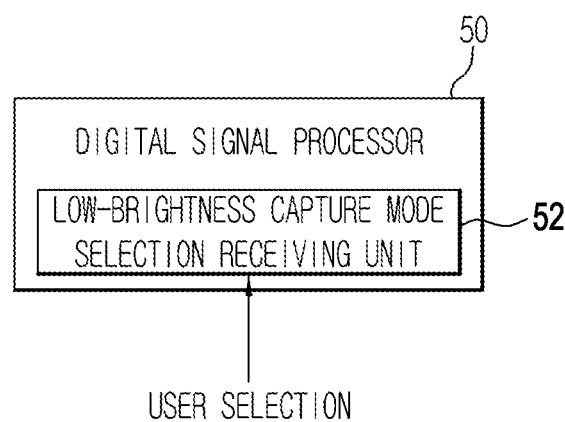
FIG. 6 is a diagram showing another embodiment of the digital signal processor of the image capture apparatus shown in FIG. 2.

FIG. 6 is a diagram showing another embodiment of the digital signal processor of the image capture apparatus shown in FIG. 2. In particular, the digital signal processor 50 shown in FIG. 6 is configured such that a user directly selects a low-brightness capture mode. The user may determine the quantity of light of the user's surroundings to decide whether the operation mode is to be set to a low-brightness capture mode. Upon deciding that the operation mode is to be set to the low-brightness capture mode, the user may rotate a dial provided at the manipulator 200 to set the operation mode to the low-brightness capture mode.

To this end, the digital signal processor 50 shown in FIG. 6 includes a low-brightness capture mode selection receiving unit 52. The low-brightness capture mode selection receiving unit 52 receives a low-brightness capture mode selection signal generated when the user selects the low-brightness capture mode through the manipulator 200 and transmits the received signal to the digital signal processor 50 such that the digital signal processor 50 recognizes the selection of the low-brightness capture mode.

Figure 7:
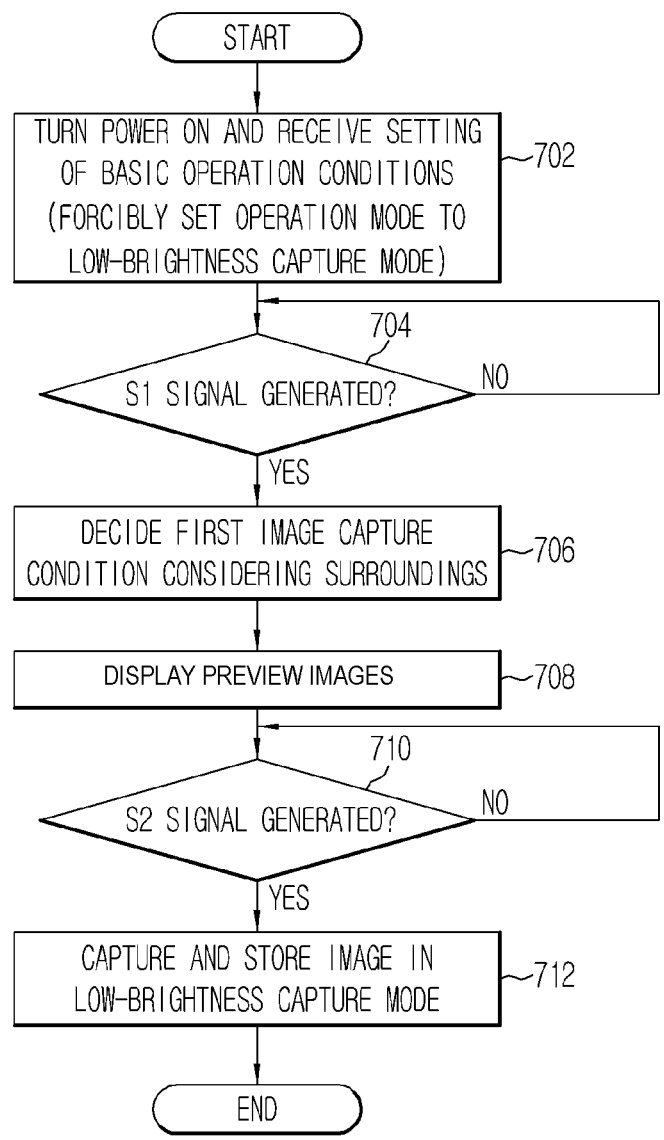
FIG. 7 is a flowchart showing an image capture control method, according to a further embodiment.

FIG. 7 is a flowchart showing an image capture control method, according to a further embodiment. In the image capture control method shown in FIG. 7, the operation mode of the image capture apparatus 150 is forcibly set to a low-brightness capture mode according user selection, and the low-brightness capture mode is executed under control of the controller 100.

As shown in FIG. 7, the controller 100 receives setting of basic operation conditions in a state in which the image capture apparatus 150 is on (702). The setting of basic operation conditions includes setting of an operation mode and setting of an image size, quality, and resolution. In addition, a user may manually (forcibly) set the operation mode of the image capture apparatus 150 to a low-brightness capture mode. When an S1 signal (first control signal) is generated in this state (YES of 704), the controller 100 sets a first image capture condition based on the surroundings of the image capture apparatus 150 (706). The S1 signal is a signal generated to perform focusing and light metering with respect to a subject according to first user manipulation of the shutter release button 158. At this time, image capture is not performed. The first image capture condition set when the S1 signal is generated includes the sensitivity, i.e. an ISO value, of the imaging device 30 and a shutter speed value SS. For example, the ISO value may be set to 100 and the shutter speed value may be set to 1 second (s) as principal conditions for determining the brightness of an image based on the quantity of light around the image capture apparatus 150. The ISO value and the shutter speed value may be changed depending upon the quantity of light around the image capture apparatus 150. When the first image capture condition including the ISO value and the shutter speed value is set, a preview image reflecting the first image capture condition is generated and displayed through the display unit 152 (708). When an image capture signal, i.e. an S2 signal (second control signal), is generated according to further user manipulation of the shutter release button 158 in a state in which the preview image is displayed (YES of 710), the controller 100 captures an image in the low-brightness capture mode and stores the captured image in the storage medium 70 (712). The S2 signal is a signal generated to capture an image according to further user manipulation of the shutter release button 158 after the generation of the S1 signal. Image capture and storage in the low-brightness capture mode will hereinafter be described in detail with reference to FIG. 8.

Figure 8:
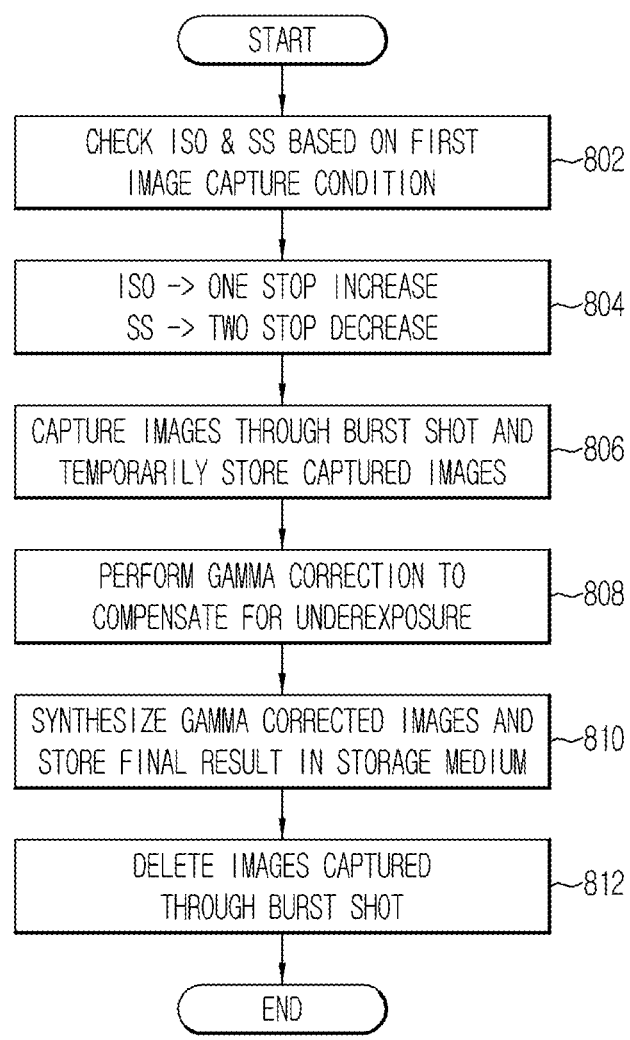
FIG. 8 is a flowchart showing an image capture method in a low-brightness capture mode, according to an embodiment.

FIG. 8 is a flowchart showing an image capture method in a low-brightness capture mode according to an embodiment. That is, the image capture method corresponds to the image capture and storage operation (416) in the low-brightness capture mode of FIG. 4, the image capture and storage operation (516) in the low-brightness capture mode of FIG. 5, and image capture and storage operation (712) in the low-brightness capture mode of FIG. 7.

As shown in FIG. 8, the controller 100 checks the ISO value and the shutter speed value SS of the first image capture condition based on the surroundings of the image capture apparatus 150 set in response to the generation of the S1 signal to capture an image at the low-brightness capture mode (802). Subsequently, a second image capture condition, in which the ISO value of the first image capture condition is increased such that the increased value is minimized if possible and the shutter speed value is decreased such that the decreased value is maximized if possible, is set to overcome the low-brightness condition (804). For example, in a case in which the ISO value is set to be increased by two stops when the S1 signal is generated (e.g., from 100 to 400) to overcome the low-brightness condition around the image capture apparatus 150, the ISO value is only one stop increased (e.g., from 100 to 200) in the low-brightness capture mode according to the embodiment. The increase of the ISO value increases the sensitivity of the imaging device 30 such that a brighter image is obtained under low-brightness conditions. However, the increase of the ISO value also increases image noise. For this reason, the ISO value is lowered if possible to obtain a high-quality image. In the low-brightness capture mode according to the embodiment, therefore, the increase of the ISO value is minimized if possible. The shutter speed value is decreased if possible such that shaking of the image capture apparatus 150 is minimized. Consequently, the shutter speed value is set to be decreased by two stops when the S1 signal is generated, for example, from 1s to ¼s. The decrease of the shutter speed value means the decrease of a value indicating the shutter speed (¼s, ⅛s, etc.), which means faster shutter release speed. As the shutter release speed is increased, exposure time of the imaging device 30 is decreased. As a result, shaking of the image capture apparatus 150 has little effect on an image, thereby obtaining a clearer image. In the low-brightness capture mode according to the embodiment, a relationship between the ISO value and the shutter speed value is that when the ISO value is increased by n/2 stop, the shutter speed value is decreased by n stop. Then, gamma correction is performed to compensate for a brightness value corresponding to n/2 stop of the ISO value.

In a state in which the ISO value is increased by one stop and the shutter speed value is decreased by two stops at operation 804, a plurality of images is captured through burst mode, and the captured images are temporarily stored in the memory 60 (806). The images obtained through burst mode are images that have not been converted in any manner, i.e. raw file format images. The raw file format images are converted into a YUV format, and then gamma correction is performed. The YUV format separately expresses brightness information Y and color information UV of each image. As the shutter speed value is decreased, the quantity of light incident upon the imaging device 30 is decreased. In this case, the ISO value is increased by two stops. In the low-brightness capture mode according to the embodiment, the ISO value is not increased by two stops and is increased by only one stop, such that the increase of the ISO value is minimized if possible as previously described. In addition, the raw file format images are converted into a predetermined specific format (for example, a JPEG or TIFF format), and gamma correction is performed with respect to each image to compensate for insufficient exposure of the images (808). The gamma correction is to correct an output brightness component Yout of each image through correction of an input brightness component Yin of each image, thereby adjusting the brightness of each image. In the low-brightness capture mode according to the embodiment, the brightness of each image is increased and the respective images are synthesized to increase the brightness of a final image.

When gamma correction on each of the images obtained through burst mode has been completed, the images are synthesized to generate a final image, and the generated final image is stored in the storage medium 70 (810). That is, the images, which have more than a predetermined level of brightness through the minimum increase of the ISO value and the gamma correction and have minimum blur in the low-brightness condition through the decrease of the shutter speed value, are synthesized to obtain a final image having little noise, more than a predetermined level of brightness, and high clear image quality. When the storage of the final image is completed, the raw file format images and the YUV file format images, which are stored in the memory 60, are deleted to increase a storage space of the memory 60 (812). As needed, the raw file format images may be stored in the storage medium 70 together with the final image such that the raw file format images as well as the final image are provided to a user.

In accordance with various embodiments as described above, the increase of an ISO value is reduced if possible and a shutter speed value is lowered if possible to capture an image at fast shutter speed when the image is captured under low-brightness conditions. In order to compensate for the insufficient ISO value, a plurality of images is obtained through burst mode and gamma correction is performed with respect to the respective images, and the gamma corrected images are synthesized, thereby obtaining a high-quality image having little noise resulting from the low ISO value, clear image quality resulting from fast shutter speed, and compensated brightness resulting from gamma correction.

Although a few embodiments of the invention have been shown and described, it would be appreciated by those skilled in the art that changes may be made in these embodiments without departing from the principles and spirit of the invention, the scope of which is defined in the claims and their equivalents.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An apparatus comprising:
   an image sensor, a sensitivity of which corresponds to an ISO value;
   a shutter, a speed of which corresponds to a shutter speed value; and
   a controller operatively coupled with the image sensor, the controller configured to:
   identify illuminance corresponding to an object external to the apparatus;
   determine whether the illuminance falls into a specified range of illuminance;
   based at least in part on a determination that the illuminance falls within the specified range, obtain a plurality of images wherein all of the plurality of images are obtained at a same ISO value and at a same shutter speed value; and
   refrain from obtaining the plurality of images based at least in part on a determination that the illuminance falls outside the specified range.

2. The apparatus of claim 1, wherein the images of the plurality of images are obtained using an increased ISO value and a decreased shutter speed value relative to an ISO value and a shutter speed value initially determined.

3. The apparatus of claim 2, wherein the ISO value is increased by a specified value and the shutter speed value is decreased by another specified value based at least in part on the obtaining of the plurality of images.

4. The apparatus of claim 1, wherein the controller is configured to:
   generate an image based at least in part on the plurality of images.

5. The apparatus of claim 4, wherein the controller is configured to:
   combine the plurality of images to produce the image.

6. The apparatus of claim 4, wherein the controller is configured to:
   compensate the image to increase a brightness.

7. The apparatus of claim 4, wherein the controller is configured to:
   refrain from storing, via memory operatively coupled with the apparatus, the plurality of images based at least in part on the generating of the image.

8. A method comprising:
   identifying illuminance corresponding to an object external to the apparatus;
   determining whether the illuminance falls into a specified range of illuminance;
   determining an ISO value and a shutter speed value;
   based at least in part on a determination that the illuminance falls within the specified range, obtaining a plurality of images wherein all of the images are obtained at a same determined ISO value and at a same determined shutter speed value; and
   refraining from obtaining the plurality of images based at least in part on a determination that the illuminance falls outside the specified range.

9. The method of claim 8, wherein the images of the plurality of images are obtained using an increased ISO value and a decreased shutter speed value relative to an ISO value and a shutter speed value initially determined.

10. The method of claim 9, wherein the ISO value is increased by a specified value and the shutter speed value is decreased by another specified value based at least in part on the obtaining of the plurality of images.

11. The method of claim 8, further comprising:
   generating an image base at least in part on the plurality of images.

12. The method of claim 11, further comprising:
   combining the plurality of images to produce the image.

13. The method of claim 11, further comprising:
   compensating the image to increase a brightness.

14. The method of claim 11, wherein the refraining comprises:
   refraining from storing, via memory operatively coupled with the apparatus, the plurality of images based at least in part on the generating of the image.

* * * * *